3,804,908
1,2,3,4,7,7 - HEXACHLORO-2-NORBORNENE AND ALPHA,OMEGA-DICHLOROALKANE TELOMERS FROM OCTACHLOROCYCLOPENTENE AND ETHYLENE
Joseph A. Hudson, Jr., Waco, Tex., assignor to Continental Oil Company, Ponca City, Okla.
No Drawing. Filed Mar. 9, 1972, Ser. No. 233,318
Int. Cl. C07c *19/02, 23/20*
U.S. Cl. 260—648 C
7 Claims

ABSTRACT OF THE DISCLOSURE

Octachlorocyclopentene and ethylene are reacted in the presence of a free radical initiator such as actinic light, peroxides, and the like, to form 1,2,3,4,7,7-hexachloro-2-norbornene and alpha,omega-dichloroalkane telomers having about 2 to about 8 carbon atoms per molecule.

BACKGROUND OF THE INVENTION

This invention relates to the synthesis of alpha,omega-dichloroalkanes such as 1,2-dichloroethane, 1,4-dichlorobutane, 1,6-dichlorohexane, and 1,8-dichlorooctane. This invention also relates to the synthesis of 1,2,3,4,7,7-hexachloro-2-norbornene.

Alpha,omega-dichloroalkanes such as 1,2-dichloroethane, 1,4-dichlorobutane, 1,6-dichlorohexane, and 1,8-dichlorooctane are in considerable demand and have considerable utility.

Arnold et al. U.S. 3,483,102, disclose that 1,2,3,4,7,7-hexachloro-2-norbornene has utility as an intermediate in chemical synthesis.

OBJECTS OF THE INVENTION

An object of the invention is to provide a process for synthesizing alpha,omega-dichloroalkane telomers and 1,2,3,4,7,7 - hexachloro-2-norbornene from ethylene and octachlorocyclopentene.

SUMMARY OF THE INVENTION

In one aspect, this invention relates to a process for the synthesis of alpha,omega-dichloroalkane telomers and 1,2,3,4,7,7-hexachloro-2-norbornene by the reaction of ethylene and octachlorocyclopentene in the presence of a free radical initiator.

DESCRIPTION OF THE PREFERRED EMBODIMENTS

The process of the invention can be represented as follows:

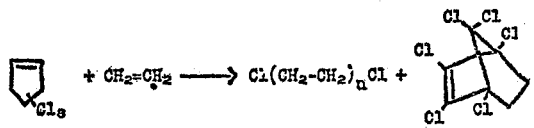

Pressures of about 300 to 15,000 p.s.i.g. can be employed. At pressures higher than 15,000 p.s.i.g., equipment costs become nonfeasible, and at pressures below about 300 p.s.i.g., insufficient ethylene is placed in the reaction environment to obtain a satisfactory rate of reaction. More preferably, pressures of 500 to 4,000 p.s.i.g. are optimumly employed.

An effective amount of free radical initiator can be present in the liquid reaction environment. Free radical initiators can include radiation such as actinic light, particularly having a wave length of 1800 A. to 3800 A., and radiation of other kinds. Chemical free radical initiators such as organic peroxides including benzoyl peroxide, acetyl peroxide, t-butyl peroxide, ethyl peroxide, succinic peroxide, t-butyl perbenzoate, t-butyl peracetate, diisopropyl percarbonate, and the like, as well as materials such as triphenylchloromethane, triethyl lead, metal oxides such as copper oxides and iron oxides, chromium, azobisisobutyronitrile and other azo compounds, and the like can be employed. When a chemical free radical initiator is employed, about 0.0001 to 0.10 moles of free radical initiator per mole of octachlorocyclopentene are most preferably employed to obtain optimum initiation of the telomerization reaction.

The conversion can also be initiated thermally. If thermal initiation is employed, temperatures of about 200 to 300° C. are suitable and temperatures of about 200 to 250° C. are presently particularly preferred.

When a free radical initiator is employed, temperatures of about 100 to 250° C. can be employed. Below about 100° C., insufficient rate of reaction occurs to be practical, and above about 250° C., side reactions and deterioration of the products becomes a major problem. More preferably, the conversion is conducted at temperatures of 150 to 210° C. for optimum results.

A ratio of about 1 to 1000 moles of ethylene per mole of octachlorocyclopentene can be employed. A preferred ratio is about 10 to 50 moles of ethylene per mole of octachlorocyclopentene.

According to a presently preferred mode of operation, the reaction environment of the conversion is rendered and maintained substantially completely free from a free radical inhibiting material.

A chlorine complexing solvent can be employed in the reaction environment if desired. Examples of suitable chlorine complexing solvents are benzene and chlorobenzene. Mixtures can be employed if desired. An effective amount, that is, an amount of chlorine complexing solvent sufficient to effect a measurable shift in selectivity toward the higher alpha,omega-dichloroalkane telomers is employed as a minimum, if a chlorine complexing solvent is employed. The only limit on the maximum amount of chlorine complexing solvent which is employed is one of feasibility, that is, the reactants should not be so diluted in the reaction environment that the rate of reaction therebetween becomes nonfeasible. The chlorine complexing solvent is often employed in amounts such that about 10 to 95 weight percent of the reaction environment is made up of a chlorine complexing solvent. Preferably, 40 to 90 weight percent of the reaction environment is chlorine complexing solvent, when such is employed. The conversion of the instant invention can also be effected in the absence of the chlorine complexing solvent, if desired. However, a chlorine complexing solvent is often advantageously employed in that good selectivities to higher telomers can be obtained with lower pressures with resulting savings in equipment outlay.

A reaction time sufficient to effect the degree of conversion desired is employed. Reaction times in the range of about 5 seconds to 10 minutes are often suitable. Reaction times which are too long lead to undesired side reactions and product deterioration.

It is also within the scope of this invention to employ an inert diluent or solvent concurrently with the chlorine complexing solvent when a chlorine complexing solvent is employed.

The ethylene starting material is widely available as an item of commerce.

The octachlorocyclohexane can be obtained from commercial sources, or can readily be obtained by chlorination of hexachlorocyclopedadiene.

The alpha,omega-dichloroalkane telomers and the 1,2,3,4,7,7-hexachloro-2-norbornene can readily be separated from one another and from any other materials of the reaction product by means well-known to the art such as fractional distillation, solvent extraction, distillation, chromatography, and the like.

According to one presently preferred embodiment, actinic light, having a wave length of 1800 A. to 3800 A. is preferably employed as a free radical initiator.

According to another presently preferred embodiment, tertiary-butyl peroxide is presently preferred as a free radical initiator.

The following examples are presented so that the process of the invention may be more readily understood. These examples should not be interpreted to limit the invention in any manner.

Example 1

To a glass-lined stainless steel reactor containing a quartz tube-type irradiation well was charged 264.5 g. of octachlorocyclopentene. The reactor was heated to about 45° C. to melt the octachlorocyclopentene, and the reactor was then purged with argon to remove any air present. The reactor was heated to about 180° C. and pressured with 800 p.s.i.g. of ethylene. Irradiation was begun with a 100 watt Hanovia mercury lamp through a quartz well. There was an immediate rapid pressure drop due to uptake of ethylene. The pressure was, however, maintained at about 700–800 p.s.i.g. by continually pressuring more ethylene to replace the ethylene utilized by the reaction. After 2 hours 25 minutes, irridation was terminated. The reactor was cooled, and the contents were removed. A product weighing 284.5 g. was obtained. Gas chromatography thereof identified the products as alpha,omega-dichloroalkanes having 2 to 8 carbon atoms per molecule and 1,2,3,4,7,7-hexachloro-2-norbornene. The yield of alpha,omega-dichloroalkanes was 28 mole percent based upon the octachlorocyclopentene starting material. The selectivity of the octachlorocyclopentene to product was 90 mole percent. A total of one mole of 1,2,3,4,7,7-hexachloro-2-norbornene was produced for each mole of alpha, omega-dichloroalkane produced.

The product contained 14.82 g. of 1,2-dichloroethane, 7.257 g. of 1,4-dichlorobutane, 1.02 g. of 1,6-dichlorohexane, and a small amount of 1,8-dichlorooctane.

Longer irradiation times are found to give higher yields of product.

When the conversion is run at lower temperatures, as at about 25° C., very little conversion results from 2.5 hours of irradiation. Use of temperatures above 250° C. result in extensive charring.

Example 2

To a 250 ml. stainless steel stirred reactor was charged 62.88 g. of octachlorocyclopentene and 37.06 g. of 1,1,2-trichlorotrifluoroethane. The reactor was thoroughly purged with argon to remove any air present. The reactor was heated to 178° C. and pressured with 780 p.s.i.g. ethylene. A solution comprised of 0.357 g. of t-butyl peroxide and 48.54 g. of 1,1,2-trichlorotrifluoroethane was then charged to the reactor over a 32 minute period with an additional 10 cc. of 1,1,1-trichlorotrifluoroethane being employed to flush the pump and tubing lines used for charging. After charging was completed, heating was continued for another 20 minutes. The reactor was then cooled and a reddish-brown liquid reaction product was recovered. The reaction product was analyzed by gas chromatography and was determined to contain 1,2,3,4,7,7-hexachloro-2-norbornene and alpha,omega-dichloroalkanes having 2 to 8 carbon atoms per molecule. A total of 1.94 g. of 1,2-dichloroethane, 0.73 g. of 1,4-dichlorobutane, 0.15 g. of 1,6-dichlorohexane, and a small amount of 1,8-dichlorooctane were determined to be present. A yield of alpha,omega-dichloroalkanes in moles obtained from the quantity of t-butyl peroxide employed was 14.4 mole percent. Selectivity of octachlorocyclopentene to the 1,2,3,4,7,7-hexachloro-2-norbornene and alpha,omega-dichloroalkane products was nearly 100 mole percent. One mole of 1,2,3,4,7,7-hexachloro-2-norbornene was produced for each mole of alpha,omega-dichloroalkane.

Larger amounts of initiator are determined to give greater conversions.

I claim:

1. A process for the production of 1,2,3,4,7,7-hexachloro-1-norbornene and alpha,omega-dichloroalkane telomers comprising contacting octachlorocyclopentene and ethylene in the presence of a free radical initiator at a temperature of 100 to 250° C. and a pressure of 300 to 15,000 p.s.ig.

2. The process of claim 1 wherein the free radical initiator is actinic light having a wave length of 1800 to 3800 A.

3. The process of claim 1 wherein the temperature is in the range of 150 to 210° C. and the pressure is in the range of 500 to 4000 p.s.i.g.

4. The process of claim 1 wherein the free radical initiator is a peroxide.

5. The process of claim 4 wherein the peroxide catalyst is t-butyl peroxide, the reaction temperature is 100 to 250° C,. and the pressure is 500 to 4000 p.s.i.g.

6. A process for the production of 1,2,3,4,7,7-hexachloro-2-norbornene and alpha,omega-dichloroalkane telomers comprising contacting octachlorocyclopentene and ethylene at a temperature of 200 to 300° C. and a pressure of 300 to 15,000 p.s.i.g.

7. The process of claim 6 wherein the temperature is 200 to 250° C. and the pressure is 500 to 4000 p.s.i.g.

References Cited

UNITED STATES PATENTS 2,742,506   4/1956   Maude et al. _____ 260—648 C
2,966,527   12/1960  Schmerling _____ 260—648 C DANIEL D. HORWITZ, Primary Examiner U.S. Cl. X.R.

260— 658 R, 659 R